Patented May 15, 1951

2,553,518

UNITED STATES PATENT OFFICE 2,553,518

PRODUCTION OF ORGANIC BROMIDES

Douglas E. Lake and Arthur A. Asadorian, Midland, Mich., assignors to The Dow Chemical Company, Midland, Mich., a corporation of Delaware No Drawing. Application February 12, 1948,
Serial No. 7,996

11 Claims. (Cl. 260—544)

This invention concerns an improved method of displacing chlorine from certain chlorine-containing organic compounds with bromine to form brominated organic products. It pertains especially to a new reaction between hydrogen bromide and organic chlorides for replacing chlorine of the latter with bromine.

It has long been known, Compte Rendus 130, 1191 (1900), that aluminum bromide reacts readily with chlorinated aliphatic hydrocarbons to replace chlorine atoms of the latter with bromine, and certain methods have been proposed for applying the reaction in the manufacture of brominated aliphatic compounds. However, the known methods for carrying out the reaction all involve serious disadvantages.

The reaction requires use of a considerable amount of aluminum bromide which is difficult to prepare, store, and handle in powdered form due to the readiness with which it deteriorates under action of moisture of the air. Also, in the reaction of aluminum bromide with a chlorinated hydrocarbon a thick aluminum chloride-containing sludge is formed which renders stirring of the mixture difficult and necessitates operation in a batchwise manner so as periodically to remove the sludge. Harlow et al. U. S. Patent 1,891,415 disclose a method wherein bromine is reacted with aluminum in a closed system to form molten aluminum bromide, and the latter is fed directly into reaction with a chlorinated hydrocarbon to form a brominated organic product. This method avoids the difficulties earlier encountered in preparing and handling powdered aluminum bromide, but it does not avoid sludge formation during the reaction of the aluminum bromide with the chlorinated hydrocarbon. Nutting et al., U. S. Patent 2,120,675, have shown that the troublesome sludge formation may be avoided by first dissolving the aluminum bromide in an inert solvent such as ethyl bromide, and feeding the solution into reaction with the chlorinated aliphatic hydrocarbon. The large proportion of inert solvent which is employed reduces, of course, the productive capacity of a reactor of given size and the presence of the solvent necessitates extra steps of removing the aluminum compounds dissolved in the reacted mixture and of separating and recovering the solvent. When using aluminum bromide as a reactant in accordance with any of the known methods just discussed, the reaction tends to stop far short of complete consumption of one or both reactants, presumably because of a chemical equilibrium between the reactants and the products.

It is an object of this invention to provide an improved method of replacing chlorine atoms of chlorinated organic compounds with bromine, which method permits use of hydrogen bromide as an agent for supplying the major portion of the bromine to the brominated product, permits employment of a metal halide catalyst in a proportion far smaller than the proportion of aluminum bromide required in the above-discussed known methods for the production of brominated organic compounds, and obviates necessity for use of an inert solvent as a reaction medium and the extra steps and expense attendant on such use of an inert medium. A further object is to provide in such method a new catalytic reaction between hydrogen bromide and organic chlorides to replace chlorine of the organic chlorides with bromine, which reaction may readily be carried substantially to completion, due apparently to the fact that hydrogen chloride formed in the reaction is evolved so that a condition of equilibrium is not obtained. Other objects will be apparent from the following description of the invention.

We have discovered that halides of aluminum and boron are effective catalysts in causing a reaction between hydrogen bromide and certain chlorinated organic compounds to replace chlorine of the latter with bromine atoms, and thereby produce brominated organic compounds. In the reaction, the aluminum or boron halide appears to function primarily as a catalyst, although it may, of course, undergo at least partial conversion from a metal salt of one halogen to a metal salt of another halogen, e. g. from aluminum chloride to aluminum bromide, and it may in some instances react with a portion of an organic starting material to form a catalytically active complex compound. The metal halide catalyst need be employed only in a small proportion within the limits of its solubility in the reaction mixture; hence, no problem of sludge formation is encountered. Usually the metal halide is employed in a proportion corresponding to between 2 and 5 mole per cent of the combined amount of the same and the chlorinated organic reactant, but it can be used in somewhat smaller proportions or in as great a proportion as desired.

Examples of aluminum and boron halides which can be employed as catalysts are aluminum chloride, aluminum bromide, boron trichloride, and boron tribromide. In place of using an aluminum or boron halide directly as a starting material, a different aluminum or boron compound, such as aluminum hydroxide, aluminum acetate, or aluminum sulfate, etc., or metallic aluminum, can be used as the starting material, and the metal halide catalyst be formed in situ by reaction of such starting material with the hydrogen bromide employed as the brominating agent. In instances in which a reaction to form an aluminum or boron halide in situ results in concurrent formation of water it is necessary that the water be removed, e. g. by treatment with a dehydrating agent, to a point at which the mixture retains less than 0.1 per cent of free water in chemically uncombined form.

The chlorinated organic compounds which may be used as reactants in the process contain chlorine attached to a carbon atom in an aliphatic or alicyclic portion of the molecule. They are not rapidly polymerized by contact with aluminum chloride at temperatures of from 0° to 90° C., and do not form, by splitting off hydrogen halide from the molecule, an unsaturated compound rapidly polymerizable on contact with aluminum chloride at temperatures within the range just stated. For the purpose of this invention, a compound that does not react to form more than 5 per cent by weight of a polymer when admixed with 5 mole per cent of aluminum chloride and maintained at a temperature of 90° C. for 1 hour is not rapidly polymerizable and is resistant to polymerization. The chlorine-containing organic compound used as a reactant may contain carbonyl, carboxy, or acyl halide radicals, since these radicals do not interfere seriously with displacement of the chlorine by bromine under the reaction conditions which are employed. However, said reactant is preferably free of other kinds of reactive functional groups.

Examples of chlorinated organic compounds which may be employed as starting materials in the process are carbon tetrachloride, chloroform, methylene chloride, methyl chloride, dichlorodibromomethane, trichloro-monobromomethane, monochloro - tribromomethane, dichloro - monobromomethane, monochloro - dibromomethane, methylene chlorobromide, ethyl chloride, propyl chloride, butyl chloride, secondary-butyl chloride, isobutyl chloride, tertiary-butyl chloride, amyl chlorides, octyl chlorides, dodecyl chlorides, ethylene chloride, ethylene chlorobromide, propylene chloride, propylene chlorobromide, butylene chloride, trimethylene chloride, tetramethylene chloride, benzyl chloride, gamma-chloro-n-propyl benzene, chloroacetic acid, gamma-chlorobutyric acid, methyl-chloromethyl ketone, ethyl-chloromethyl ketone, tetrachlorethylene, cyclohexyl chloride, 4-methyl-cyclohexyl chloride, cyclohexylmethyl chloride, chloromethyl methyl ether, acetyl chloride, propionyl chloride, alpha-chloro-acetyl chloride, and alpha-chloro-acetyl bromide, etc. The invention pertains especially to employment of saturated chlorinated aliphatic hydrocarbons in the process, and more particularly to employment of chlorine-containing halomethanes as the chlorinated organic reactants.

The reaction for production of the brominated organic product is carried out in liquid phase, at temperatures between 0° and the decomposition temperature of the brominated organic product. It is advantageously carried out at temperatures below the atmospheric boiling point of the chlorine-containing organic reactant, but it may be carried out at other temperatures, e. g. from 0° to 150° C. and in some instances at temperatures as high as 200° C. or above.

In practice a minor amount, usually from 2 to 5 mole per cent, of an aluminum or boron halide is dissolved in the liquid or liquefied chlorine-containing organic compound used as a starting material, and gaseous hydrogen bromide is fed into the solution while maintaining the mixture at temperatures within the limits just given and preferably in a range of from 0° to 90° C. Hydrogen chloride is preferably vented from the reactor as it is formed by the reaction, but it may in some instances be retained within the reaction chamber until after completion of the reaction. The reaction is usually carried out at atmospheric pressure, but it may be conducted at lower or higher pressures. When employing a normally gaseous chlorine-containing organic reactant such as methyl chloride, it is advantageous, of course, to conduct the reaction at a superatmospheric pressure sufficient to maintain said reactant in liquefied form. Pressures greater than atmospheric may, of course, also be applied when employing other chlorinated organic compounds in the process.

The reaction which occurs between hydrogen bromide and the chlorinated organic starting material involves displacement of chlorine from the latter by the bromine of the hydrogen bromide with formation of gaseous hydrogen chloride which is evolved from the liquid reaction mixture and is preferably vented from the reaction vessel. In many instances, the brominated organic compound which is formed corresponds to the chlorinated organic compound used as a starting material, but in some instances the brominated product is an isomer of the compound which would correspond to the chlorinated organic reactant. For instance, when using isobutyl chloride as a starting material, tertiary-butyl bromide is formed as the principal product. Also, when using normal butyl chloride as a reactant, secondary-butyl bromide is produced, usually in admixture with some normal butyl bromide. In general, the reaction for displacement of a chlorine substituent on a terminal carbon atom of a carbon chain molecule by the reaction results in formation of a secondary or tertiary organic bromide as a principal product.

When using a polychlorinated aliphatic hydrocarbon, e. g. carbon tetrachloride, chloroform, or ethylene chloride, etc., as a reactant, the reaction may be carried to a point at which an organic chlorobromide is produced as the principal product, or it may be continued to obtain substantially complete displacement of chlorine from the starting material with production of a polybrominated organic compound as the principal product. In applying the process for production of an organic chlorobromide, e. g. for the production of methylene chlorobromide from methylene chloride, over-brominated material such as methylene dibromide is usually obtained in admixture with the desired organic chlorobromide product. The over-brominated material may be separated and returned, together with the newly added starting materials, to the reaction where it serves to suppress further formation of such over-brominated product and thus enhances formation of the desired organic chlorobromide product in an increased yield.

Introduction of hydrogen bromide to a reaction in the manner described above is continued until the desired degree of substitution of bromine for chlorine in the chlorinated organic starting material has taken place. The extent of the reaction may be determined at any time either from the change in specific gravity of the mixture which results from the reaction, or by withdrawing samples of the reaction mixture and analyzing them.

After completing the reaction to the extent desired, the introduction of hydrogen bromide is discontinued and the reaction mixture is treated to remove, or destroy the catalytic activity of, the aluminum or boron compounds dissolved therein. Such metal compounds may be removed or deactivated in various known ways, for instance, by adding a minor amount of an aqueous alkali such as sodium carbonate, or by washing the product with water or with an aqueous mineral acid solution or with an aqueous alkali solution, etc., to remove the metal compounds. The product is then dried and distilled to separate the desired brominated organic product.

As procedure alternative to that just described, the reaction may be carried out in continuous manner by passing the hydrogen bromide and organic chloride reactants through a bed of granular aluminum chloride or bromide under conditions such that a liquid phase of organic halide material is present in the bed and withdrawing hydrogen chloride and the brominated organic product as they are formed. The organic chloride reactant may be introduced in liquid or vapor form, but it is necessary that sufficient organic liquid, e. g. said chloride or the organic bromide product, be present in the bed to permit the reaction to take place in liquid phase.

For instance, a vapor mixture of hydrogen bromide and methyl chloride may be passed under pressure and at temperatures in the order of from 0° to 90° C. through a bed of granular aluminum chloride, or aluminum bromide, containing liquid methyl bromide to effect the reaction for production of further amounts of methyl bromide while venting hydrogen chloride and withdrawing methyl bromide as they are formed. This mode of conducting the catalytic reaction may be of advantage when employing a normally gaseous chlorinated organic starting material such as methyl chloride, but the afore-described liquid phase mode of operation using a dissolved metal halide in catalytic amount is preferred when using non-gaseous chlorine-containing starting materials.

Although it is an advantage of the present process that the reaction may be carried out smoothly and readily without employment of an inert liquid as a reaction medium, use of diluents in the reaction is not excluded from the scope of the invention, and diluents may in some instances be used with advantage. For instance, when the chlorinated organic compounds subjected to the reaction is a solid at the reaction temperature, the compound may advantageously be dissolved in a liquid brominated hydrocarbon solvent such as ethyl bromide or propyl bromide, etc. prior to the bromination reaction.

The following examples describe a number of ways in which the principle of the invention has been applied, but are not to be construed as limiting the scope of the invention.

EXAMPLE 1

A total of 324 grams of gaseous hydrogen bromide was bubbled into a solution of 6.7 grams (0.05 mole) of aluminum chloride in 153.4 grams (1 mole) of carbon tetrachloride while warming the mixture sufficiently to maintain it in liquid condition. The mixture was heated from about room temperature to approximately 90° C. during introduction of the hydrogen bromide. Hydrogen chloride, evolved during the reaction which took place, was absorbed in water. After terminating introduction of the hydrogen bromide, the reaction mixture was scrubbed with water, dried, and analyzed. It contained approximately 94 per cent by weight of carbon tetrabromide and 6 per cent of tribromo-monochloromethane. Approximately 87 per cent of the carbon tetrachloride initially employed was consumed in the reaction, the unreacted carbon tetrachloride being recovered in the aqueous liquor used for absorbing the hydrogen chloride which was formed.

EXAMPLE 2

The first of two flasks, connected for passage of gas therethrough in series, was charged with a solution of 67 grams of aluminum chloride in 1540 grams of carbon tetrachloride. The second flask was charged with a similar solution of 27 grams of aluminum chloride in 616 grams of carbon tetrachloride. A total of 990 grams of gaseous hydrogen bromide was passed into the first flask, any gas from the first flask being fed into the second flask, and the latter being provided with a vent. When all of the hydrogen bromide had been fed in, the reaction mixture in each flask was washed with water, dried, and analyzed. The product obtained from the first flask consisted of approximately 50 per cent by weight of unreacted carbon tetrachloride, 27 per cent of monobromo-trichloromethane, 16 per cent of dibromo-dichloromethane, and 7 per cent of higher boiling material. The product from the second flask consisted of approximately 59 per cent of unreacted carbon tetrachloride, 26 per cent of monobromo-trichloromethane, 12 per cent of dichloro-dibromomethane, and 3 per cent of higher boiling material. Hydrogen chloride evolved during the reaction was absorbed in water. The above products and the absorbed hydrogen chloride were collected in amounts accounting for 92.6 per cent of the chlorine content and 95 per cent of the bromine content of the starting materials.

EXAMPLE 3

Gaseous hydrogen bromide was passed into a solution of 26.7 grams of aluminum bromide and 239 grams of chloroform until a total of 265 grams of hydrogen bromide had been introduced. Hydrogen chloride which was evolved during the reaction that took place was absorbed in water. The liquor remaining in the reaction vessel was washed with water, dried, and analyzed. It was found to consist of approximately 2 per cent by weight of chloroform, 15 per cent of monobromo-dichloromethane, 40.9 per cent of dibromo-monochloromethane, and 42.1 per cent of bromoform. The water used for absorption of the evolved hydrogen chloride was found to contain 21 grams of an insoluble oily organic condensate. This organic material was separated, dried, and analyzed. It was found to consist of approximately 68.3 per cent by weight of chloroform and 31.7 per cent of monobromo-dichloromethane. The products collected had a total bromine content corresponding to 92.5 per cent of that of the hydrogen bromide fed to the reaction. The water used for absorption of the evolved hydrogen chloride contained hydrogen bromide in amount corresponding to 4 per cent of the hydrogen bromide used as a starting material.

EXAMPLE 4

The procedure of Example 3 was repeated, except that the aluminum bromide was omitted and its molecular equivalent of aluminum chloride was employed. The results were almost identical with those reported in Example 3.

EXAMPLE 5

The procedure of Example 3 was repeated, except that a total of 480 grams of gaseous hydrogen bromide was fed to the reaction. The organic product contained approximately 95.2 per cent by weight of bromoform.

EXAMPLE 6

This example illustrates the fact that the aluminum halide, employed as a catalyst, for the reaction of hydrogen bromide with a chlorinated hydrocarbon to displace chlorine from the latter with bromine may be formed in situ within the reaction mixture by using metallic aluminum as a starting material. Gaseous hydrogen bromide was fed into a mixture of 59.75 grams of chloroform and 0.675 gram of aluminum powder until the specific gravity of the mixture increased from an initial value of about 1.498 to a final value of 1.69 at room temperature. The aluminum was dissolved during introduction of the hydrogen bromide and gaseous hydrogen chloride was evolved, indicating that the reaction took place smoothly. The product contained approximately 53 per cent by weight of unreacted chloroform, 34 per cent of monobromo-dichloromethane and 13 per cent of dibromo-monochloromethane.

EXAMPLE 7

Each of three vessels connected for passage of gas in series therethrough was charged with a solution of 105 grams of aluminum bromide in 500 cubic centimeters of liquid methylene dichloride. Gaseous hydrogen bromide was fed into the first vessel at a point below the level of the liquid therein. Gas evolved from the first vessel passed into the liquid in the second vessel, and gas from the second vessel passed into the liquid of the third vessel. Hydrogen chloride formed in the reaction was vented from the third vessel. Introduction of the gaseous hydrogen bromide to the first vessel was continued as long as the specific gravity of the liquor therein increased, but was discontinued when the gravity of said liquor remained substantially constant for a considerable period of time, e. g. about 20 minutes. The liquor from each vessel was washed with water and analyzed. The liquor from the first of the reaction vessels was found to consist of approximately 99.5 per cent by weight of methylene bromide and 0.5 per cent of methylene chlorobromide. The product from the second reaction vessel consisted of approximately 46.4 per cent of methylene bromide, 47.3 per cent of methylene chlorobromide, and 6.3 per cent of unreacted methylene chloride. The product from the third vessel was found to consist of approximately 18.3 per cent of methylene bromide, 54.7 per cent of methylene chlorobromide, and 27 per cent of unreacted methylene chloride. The total bromine content of the products from the three vessels corresponded to 91 per cent of the bromine content of the hydrogen bromide consumed in the reaction.

EXAMPLE 8

In each of a series of experiments, the organic reactant named in the following table was treated with aluminum chloride in amount such as to form an aluminum chloride solution of 5 mole per cent concentration. Hydrogen bromide was passed into the resultant solution at about room temperature. Thereafter the reaction liquor was washed with water, dried, and analyzed to identify the organic products. The table names the chlorine-containing organic reactant employed in each experiment and the bromine-containing organic products obtained.

*Table*

| Experiment No. | Organic Reactant | Product |
|---|---|---|
| 1 | sec.-butyl chloride | sec.-butyl bromide. |
| 2 | n-butyl chloride | n-butyl bromide and sec.-butyl bromide. |
| 3 | tertiary-butyl chloride | tertiary-butyl bromide. |
| 4 | isobutyl chloride | tertiary-butyl bromide and a minor amount of isobutyl bromide. |
| 5 | trimethylene-chlorobromide | trimethylene bromide, 1,2-propylene bromide, propylene-chlorobromides. |
| 6 | n-dodecyl chloride | a dodecyl bromide, probably secondary. |
| 7 | monochloroacetic acid | monobromoacetic acid. |

EXAMPLE 9

Gaseous hydrogen bromide was bubbled into a solution of 6.7 grams of aluminum chloride in 78.5 grams (1 mole) of acetyl chloride. A total of 50 grams (0.62 mole) of hydrogen bromide was introduced over a period of two hours. The temperature of the reaction mixture increased from 15° to 30° C. during introduction of the hydrogen bromide. Hydrogen chloride evolved during the reaction was absorbed in water. After completion of the reaction, the scrubbing water was found to contain 22.3 grams (0.61 mole) of hydrochloric acid and approximately (0.01 mole) of hydrobromic acid. The organic product was fractionally distilled to separate the products. Approximately 68.5 per cent of the weight of the product subjected to distillation was acetyl bromide. The balance of the product was unreacted acetyl chloride.

EXAMPLE 10

Approximately 25 grams (0.31 mole) of hydrogen bromide was fed, over a period of 1.5 hours, into a solution of 4.3 grams of aluminum chloride in 71 grams of cyclohexyl chloride while heating the mixture at a temperature of 90° C. Hydrogen halide evolved during the reaction was absorbed in water. The scrubbing water was found to contain 0.06 gram mole of hydrochloric acid and 0.19 gram mole of hydrobromic acid. During the reaction the reaction liquor increased in specific gravity from an initial value of 0.996 to a final value of 1.028, both determined at 20°/20° C. From the increase in specific gravity of the reaction mixture, it is estimated that between 9 and 10 per cent of the cyclohexyl chloride initially employed was converted to cyclohexyl bromide.

EXAMPLE 11

Gaseous hydrogen bromide was passed at room temperature into a solution of 5 mole per cent of boron tribromide in carbon tetrachloride until the specific gravity of the reaction mixture had increased from an initial value of 1.60 to a final value of 1.885 as determined at room temperature. The product was washed with water, dried and analyzed. It contained approximately 49 per cent by weight of carbon tetrachloride, 29 per cent of monobromo-trichloromethane, 14 per cent of dibromodichloromethane, and 8 per cent of tribromochloromethane.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. A method for removing chlorine from a chlorinated organic compound and replacing the chlorine with bromine which comprises forming a mixture of hydrogen bromide and a liquid chlorine-containing organic compound that is free of functional groups other than halogen atoms, carbonyl groups, carboxy radicals and acyl halide radicals, remains at least 95 per cent unpolymerized when admixed with 5 mole per cent of aluminum chloride, $AlCl_3$, at temperatures between 0° and 90° C. for 1 hour, and does not undergo dehydrohalogenation to form a more readily polymerizable unsaturated organic compound under the conditions just stated, and contacting the mixture of hydrogen bromide and said liquid chlorine-containing organic compound with a metal halide of the group consisting of the chlorides and bromides of aluminum and boron while maintaining the mixture at reaction temperatures below that at which the brominated organic product is decomposed.

2. A method of treating a chlorine-containing organic compound that is free of reactive functional groups other than halogen atoms, carbonyl groups, carboxy radicals and acyl halide radicals, remains at least 95 per cent unpolymerized when admixed with 5 mole per cent of aluminum chloride, $AlCl_3$, at temperatures between 0° and 90° C. for 1 hour, and does not undergo dehydrohalogenation to form a more readily polymerizable unsaturated organic compound under the conditions just stated, to displace from said compound a chlorine atom, that is attached to a carbon atom in an aliphatic portion of the molecule and that has its valences satisfied by at least one of the elements hydrogen, carbon, oxygen, chlorine and bromine, and form a brominated organic compound, which method comprises passing hydrogen bromide into a liquid solution of a major amount of said chlorine-containing organic compound and a minor amount of a metal halide of the class consisting of the chlorides and bromides of aluminum and boron while maintaining the mixture at a reaction temperature of from 0° C. to its boiling temperature at atmospheric pressure.

3. A method of removing chlorine from a chlorine-containing aliphatic halohydrocarbon and replacing the chlorine with bromine, which method comprises passing hydrogen bromide into a liquid solution of a major amount of the chlorine-containing aliphatic halohydrocarbon and a catalytic amount of aluminum chloride while maintaining the mixture at reaction temperatures between 0° and 90° C.

4. A method, as set forth in claim 3, wherein the chlorine-containing aliphatic halohydrocarbon reactant is a saturated compound.

5. A method, as set forth in claim 3, wherein the chlorine-containing aliphatic halohydrocarbon reactant contains only one carbon atom in the molecule.

6. A method, as set forth in claim 3, wherein the chlorine-containing aliphatic halohydrocarbon contains only one carbon atom in the molecule and is free of halogen substituents other than chlorine and bromine.

7. A method, as set forth in claim 3, wherein the chlorine-containing aliphatic halohydrocarbon is chloroform.

8. A method, as set forth in claim 3, wherein the chlorine-containing aliphatic halohydrocarbon is methylene chloride.

9. A method of removing chlorine from a chlorine-containing aliphatic halohydrocarbon and replacing the chlorine with bromine, which method comprises passing hydrogen bromide into a liquid solution of a major amount of the chlorine-containing aliphatic halohydrocarbon and a catalytic amount of aluminum bromide while maintaining the mixture at reaction temperatures between 0° and 90° C.

10. A method, as set forth in claim 3, wherein the chlorine containing aliphatic halohydrocarbon is carbon tetrachloride.

11. A method for making acetyl bromide which comrises passing hydrogen bromide into a liquid solution of a major amount of acetyl chloride and a catalytic amount of aluminum chloride while maintaining the mixture at a reaction temperature of from 0° C. to the boiling temperature of the mixture at atmospheric pressure.

DOUGLAS E. LAKE.
ARTHUR A. ASADORIAN.

REFERENCES CITED

The following references are of record in the file of this patent:

UNITED STATES PATENTS

| Number | Name | Date |
| --- | --- | --- |
| 1,891,415 | Harlow | Dec. 20, 1932 |
| 2,120,675 | Nutting | June 14, 1938 |
| 2,347,000 | Scherer et al. | Apr. 18, 1944 |